United States Patent Office 2,984,114
Patented May 16, 1961

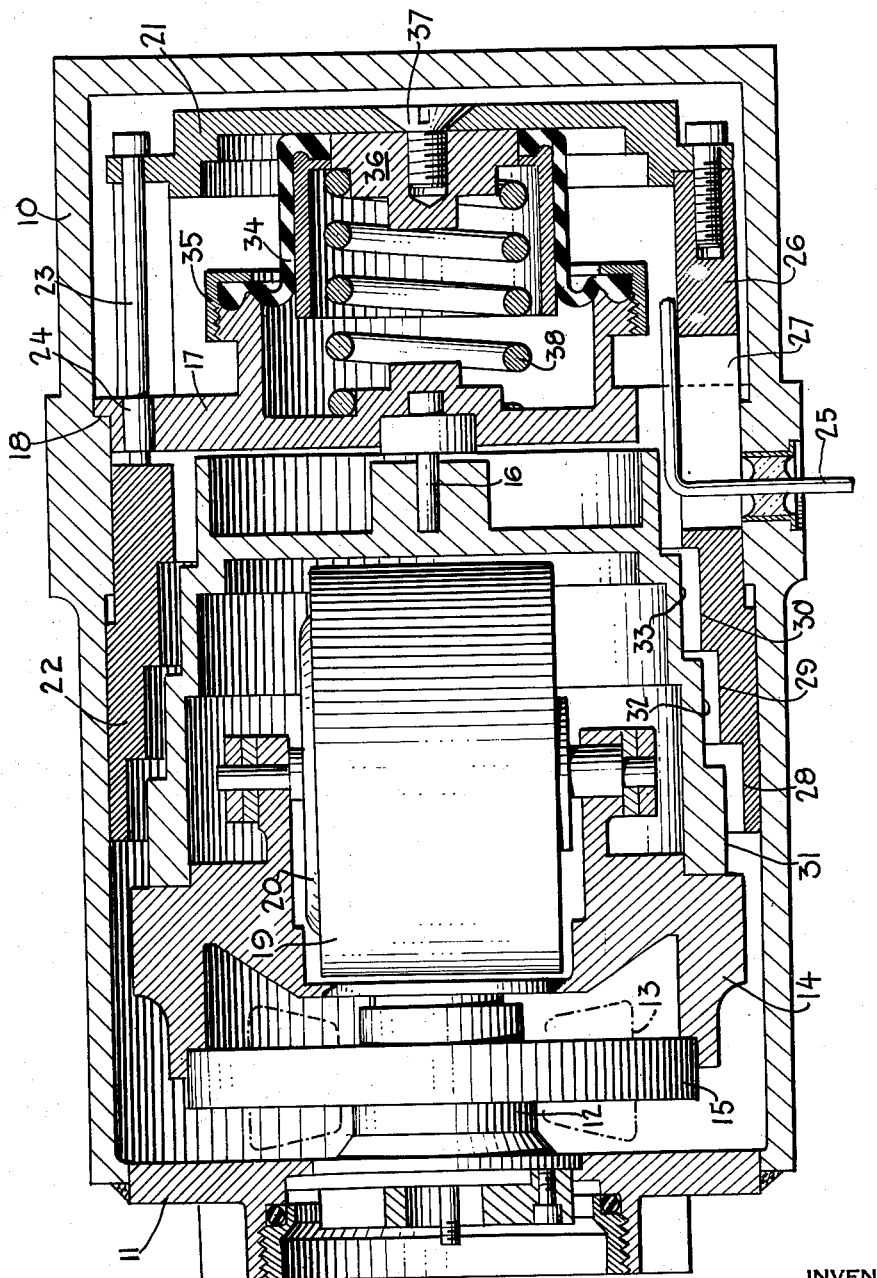

2,984,114

GYROSCOPES

Lewis S. Bostwick, Jr., Huntington, and Edgar R. Brastow, Huntington Station, N.Y., assignors, by mesne assignments, to American Machine and Metals, Inc., New York, N.Y., a corporation of Delaware Filed Mar. 20, 1959, Ser. No. 800,742

4 Claims. (Cl. 74—5.5)

This invention relates to gyroscopes and particularly to gimbal damping therefor in a rate gyro or the like.

It is desirable to damp the movement of the gimbals of a rate gyro or the like so that it will have the required response for its application. Various means have been suggested in the past including employment of fluid in the casing. Such has not been satisfactory without using heaters or some other type of mechanical damping compensation because of change of fluid viscosity with temperature. Another prior method has been to use material having differing temperature coefficients of expansion. In such an instance, the inner diameter surface of the gimbal can be made of nylon and the mating element surface of steel. Another combination of materials for such a purpose would be aluminum and steel. The difficulty with such a solution is that such does not correct the nonlinear damping characteristic which results from the linear fluid temperature changes. This is because the linear compensation resulting from the expansion or contraction of the metals and plastic or other metal does not follow the nonlinear changes of fluid viscosity with temperature. Still another compensating method employs bimetallic strips as the temperature sensing devices, these cooperating with the opening of piston-type damping chambers in the assembly.

One of the objects of the invention is to provide an improved compensating arrangement for a gyro which will not be affected by changes in fluid viscosity.

Another of the objects of the invention is to provide a gyro damping arrangement wherein the nonlinearity of fluid viscosity with temperature will be compensated.

In one aspect of the invention, a gyro mechanism, such as a rate gyro, may include a casing and the usual shell carrying a rotor therein, the shell being oscillatably mounted in the casing by torsion bar means or otherwise as is known in the art. A fluid such as a silicone fluid is used in the casing, such floatingly supporting the shell. The shell has the usual rotatable gyro rotor therein.

The shell and mating part movable relative thereto have surface areas arranged to change nonlinearly in relation to the nonlinearity of the change in fluid viscosity with temperature so as to provide constant damping. In a preferred form, the shell is provided with a stepped surface means including cylindrical portions of decreasing diameter. Within the casing, a longitudinally movable slide means having a stepped surface is provided following generally or complementary to the pattern of the stepped surface on the shell, there being a means for moving the slide means and its stepped surface relative to the stepped surface on the shell. A motor means, such as a bellows, can be located in the casing and can be connected to said slide so that volume expansion of the fluid due to temperature will move the stepped surfaces relative to each other. Change in damping relation of the surfaces will change the effective damping area thereof in a nonlinear or any desired pattern. Such pattern can be correlated to the volume expansion of the fluid to provide the desired damping of the gyro.

These and other objects, advantages and features of the invention will become apparent from the following description and drawing.

In the drawing:

Fig. 1 is an enlarged sectional view showing one form of the invention.

The invention will be described in conjunction with a rate gyro having torsion bar support for the shell or gimbal but can be used for other purposes. Casing 10 of conventional construction may have signal pick-up or pickoff end cap 11, said cap carrying a torsion bar or similar means in hub 12, said hub 12 also having the pickoff or stationary element of the signal pickup means 13 mounted thereon. Shell or gimbal 14 can have rotatable element 15 of the signal generating means for the pickoff mounted at one end thereof in the usual manner. The opposite end of shell 14 may be supported in fixed plate or mounting means 17, plate or mounting means 17 being positioned by shoulder 18 of casing 10. Gyro rotor 19 is located on the outside of gyro stator 20 in any desired manner, the stator being electrically connected to a source of energy (not shown) as desired.

A slide operating end plate 21 is connected to stepped longitudinally movable damping slide 22. For example, there may be a plurality of studs 23 extending from end plate 21 through guide apertures 24 in fixed plate 17 to slide 22. If desired and in order to accommodate the filling or pinch tube 25 extending into the cavity within the casing, one of the connections between end plate 21 and the slide may be in the form of a bar 26 having a slot 27 therein to accommodate the filling tube 25.

The arrangement of the steps or surface areas can be selected so as to produce the desired damping between the relatively rotatable surfaces. As an example, steps 28, 29 and 30 of the sliding sleeve may be of different lengths, steps 28 and 29 in the drawing being of approximately the same length and 30 being longer than steps 28 and 29. Steps 31, 32 and 33 of the gimbal or shell 14 may be of the same length but may be varied in relation to the slide steps to provide the desired effect. The clearance between the diameters of mating steps, such as steps 29, 31, etc. is relatively small.

Slide 22 can be moved by a motor responsive to volume change of the flotation fluid. One example of a motor is bellows 34 connected to fixed plate 17 by means of a clamping nut 35. The other end of the bellows may be clamped between cup-shaped member 36 and movable end plate 21, the parts being held in place by screw 37. The bellows 34 may be of rubber, neoprene or other similar flexible material. Compression spring 38 can be located within the bellows so as to provide the desired return force when the fluid contracts. The spring 38 is desirable to insure correct operation of the damping sleeve as temperature decreases so as not to depend solely upon vacuum within the contracting liquid area.

Preferably, the flexible bellows should be capable of relatively large travel with a minimum of spring constant because in a closed system of the type involved, internal pressure resulting from the spring force will tend to push the outer casing apart. Thus, the bellows should have the lowest spring constant obtainable or preferably of no spring constant at all, such as a rubber bellows or the like.

By way of example, the flotation fluid may be a silicone fluid such as that sold under the name "Dow Corning 200" or 510 Series. In such a fluid, there is a nonlinear change in fluid viscosity with temperature so that the temperature coefficient of the volume expansion, which is substantially linear, will produce the correct nonlinearity change in damping effect due to the movement of the steps of the sliding sleeve relative to the steps of the gimbal case.

By use of the described arrangement, a relatively large amount of power will be available to operate the system. As a consequence, the sliding sleeve need not be polished and close tolerances are not required.

The bellows illustrated can be replaced by other types of bellows such as the conventional corrugated type. Other variations can be made in the details of construction without departing from the spirit of the invention except as defined in the appended claims.

What is claimed is:

1. In a gyro mechanism, the combination including a casing having a fluid therein, a shell in said fluid, said shell carrying a rotor, means oscillatably mounting said shell in said casing, stepped surface means on said shell, mating stepped surface means being movable relative to said shell along a predetermined path, the engagement of each step of said mating stepped surface means with the step of said shell surface means adjacent thereto upon relative motion therebetween varying over different portions of said predetermined path, the total engagement of said mating, stepped surface means with the steps of said shell surface means varying as a non-linear function of said relative motion, and means responsive to changes in volume of said fluid for moving said surface means relative to each other so that the damping resulting from the non-linear variation of the engagement of said surface means can be predetermined.

2. In a rate gyro mechanism or the like, the combination including a casing having a viscous fluid therein, shell means in said fluid, said shell having a gyro rotor therein, means for oscillatably mounting said shell means in said casing, a plurality of surface areas of different diameters on said shell means, and slide means having a plurality of surface areas cooperating with said surface areas of said shell means and being movable relative thereto along a predetermined path, the engagement of each surface area of said slide means with the cooperating surface area of said shell means upon relative motion therebetween varying over different portions of said predetermined path, the total engagement of said surface areas of said shell means with the surface areas of said slide means varying as a non-linear function of said relative motion, said surface areas being movable relative to each other so that the damping resulting from the non-linear variation of the total engagement of said surface means can be predetermined.

3. In a rate gyro or the like, the combination including a casing having a viscous fluid therein, shell means in said fluid, said shell means having a gyro rotor therein, means for oscillatably mounting said shell means in said casing, a plurality of surface areas of different diameters on said shell means, slide means having a plurality of surface areas of different diameters cooperating with said surface areas of said shell means, and being movable relative to said shell means along a predetermined path, the engagement of each surface area of said slide means with the cooperating surface area of said shell means upon relative motion therebetween varying over different portions of said predetermined path, the total engagement of said surface areas of said shell means with the surface areas of said slide means varying as a non-linear function of said relative motion, and means reciprocably moving said slide means in response to changes of volume of said fluid in said casing so as to obtain a predetermined damping effect and to compensate for charges in the viscosity of said fluid with temperature.

4. In a rate gyro mechanism or the like, the combination including a casing having a viscous fluid therein, shell means in said fluid, said shell means having a gyro rotor therein, means for oscillatably mounting said shell means in said casing, a plurality of surface areas of different diameters on said shell means, slide means longitudinally movable in relation to the axis of said casing along a predetermined path and having a plurality of surface areas of different diameters cooperating with said surface areas of said shell means, the engagement of each surface area of said slide means with the cooperating surface area of said shell means upon relative motion therebetween varying over different portions of said predetermined path, the total engagement of said surface areas of said shell means with the surface areas of said slide means varying as a non-linear functions of said relative motion, and means reciprocably moving said slide means longitudinally relative to said casing in response to changes in volume of said fluid in said casing so as to obtain a predetermined damping effect and to compensate for changes in the viscosity of said fluid with temperature.

References Cited in the file of this patent

UNITED STATES PATENTS

| | | |
|---|---|---|
| 1,238,098 | Brinton | Aug. 28, 1917 |
| 2,864,256 | Haagens et al. | Dec. 16, 1958 |
| 2,902,863 | Steele | Sept. 8, 1959 |